(12) United States Patent
Cottrell et al.

(10) Patent No.: US 9,402,473 B2
(45) Date of Patent: Aug. 2, 2016

(54) MECHANISM FOR GANGING TABLES

(71) Applicant: Haworth, Inc., Holland, MI (US)

(72) Inventors: John C. Cottrell, Grand Rapids, MI (US); Daniel Grabowski, Grand Rapids, MI (US); David Gresham, Grand Rapids, MI (US)

(73) Assignee: Haworth, Inc., Holland, MI (US)

( * ) Notice: Subject to any disclaimer, the term of this patent is extended or adjusted under 35 U.S.C. 154(b) by 0 days.

(21) Appl. No.: 14/297,775

(22) Filed: Jun. 6, 2014

(65) Prior Publication Data

US 2015/0351537 A1    Dec. 10, 2015

(51) Int. Cl.
| | | |
|---|---|---|
| *A47B 57/00* | (2006.01) | |
| *A47B 87/00* | (2006.01) | |
| *F16B 1/00* | (2006.01) | |
| *F16B 12/52* | (2006.01) | |
| *A47B 13/02* | (2006.01) | |
| *F16B 12/42* | (2006.01) | |

(52) U.S. Cl.
CPC ............. *A47B 87/002* (2013.01); *A47B 13/021* (2013.01); *F16B 1/00* (2013.01); *F16B 12/52* (2013.01); *F16B 12/42* (2013.01); *F16B 2001/0035* (2013.01); *Y10T 24/32* (2015.01)

(58) Field of Classification Search
CPC ..................................................... A47B 87/002
USPC .......... 108/64, 65, 69; 403/DIG. 1, 300, 292; 248/188, 188.1, 188.8
See application file for complete search history.

(56) References Cited

U.S. PATENT DOCUMENTS

| 2,340,864 | A | * | 2/1944 | Carpenter .................... 52/127.9 |
| 3,342,147 | A | * | 9/1967 | Shettles .......................... 108/64 |
| 5,794,545 | A | * | 8/1998 | McDaniel et al. .............. 108/64 |
| 5,934,203 | A | * | 8/1999 | Glass ............................ 108/156 |
| 7,267,378 | B2 | * | 9/2007 | Drumm ...................... 292/251.5 |
| 7,543,394 | B2 | * | 6/2009 | Enderle et al. .................. 33/503 |

* cited by examiner

*Primary Examiner* — Matthew Ing
(74) *Attorney, Agent, or Firm* — Warner Norcross and Judd LLP

(57) ABSTRACT

A ganging mechanism is configured to releasably attach a first object to a second object. The ganging mechanism includes a first part that is coupled to the first object. The first part includes a movable portion that carries a first ganging member. The movable portion is positionable between a stowed position and an extended position. The second part is coupled to the second object. The second part includes a receiver portion that receives the movable portion in the extended position. The second part includes a second ganging member that is configured to couple to the first ganging member resulting in the first object being ganged to the second object. The first and second ganging members are releasably coupled to one another by magnetic attraction.

19 Claims, 12 Drawing Sheets

MECHANISM FOR GANGING TABLES

TECHNICAL FIELD

The present invention relates generally to tables or other support members and more specifically, to tables that are configured to gang together during use and in particular, to table leg constructions that incorporate the ganging components.

BACKGROUND

Tables of various shapes are used in diverse applications and arrangements. Given spatial constraints of many rooms, it is not desirable to have a large fixed conference table/work surface, etc. Instead, it is many times more desirable to have a number of smaller tables that can be arranged in any number of different ways, thereby increasing the number of different layout options available for the room and also allowing different grouping of people. However, there are times when it is desirable to have a larger table (work surface) and typically, in order to create such work surface, two or more tables are arranged adjacent and abutting one another.

It is therefore desirable to be able to interconnect and lock in place abutting tables for increased stability. One disadvantage of existing connecting devices is that many of the connecting devices require the user to tighten a screw or bolt to connect and lock the adjoining tables in place. This requires considerable time and effort for the user especially where the tables are reconfigured several times a day to satisfy different requirements of the room. Also, over time, the screw or bolt threads can become dirty or worn and the connecting device will not function properly.

In addition, many of the connecting devices are fixedly mounted to the tabletop and therefore it is more difficult for such tabletops to be used as part of a modular system. As a result, most table designers and manufacturers are required to maintain an inventory of many different types of table connecting devices. This generally substantially increases engineering design costs, requires many different design drawings, increases manufacturing costs, such as tooling, increases inventory volume because multiple connecting devices are required, and creates potential manufacturing and packaging difficulties.

In addition, the present invention is configured such that it is easier for the installer and the customer. Current ganging clips are hard to install and often times they are not positioned perfectly such that the engagement and disengagement is determined by how well they are installed. In the present invention, the ganging mechanism works the same all the time, every time with no extra installation. For the customers current ganging clips get lost or not used because they are difficult to use or they fall of the table and get lost.

SUMMARY

A ganging mechanism is configured to releasably attach a first object to a second object. The ganging mechanism includes a first part that is coupled to the first object. The first part includes a movable portion that carries a first ganging member. The movable portion is positionable between a stowed position and an extended position. The second part is coupled to the second object. The second part includes a receiver portion that receives the movable portion in the extended position. The second part includes a second ganging member that is configured to couple to the first ganging member resulting in the first object being ganged to the second object. The first and second ganging members are releasably coupled to one another by magnetic attraction.

A table that is configured to be ganged to another table includes a table top having an underside with at least one hole formed therein. The table includes at least one first leg that is coupled to the underside and includes a portion which is received within the hole. The first leg includes a pivotable swing arm that carries a first ganging member. The swing arm is positionable between a stowed position and an extended position in which a portion of the swing arm extends beyond a peripheral edge of the table. The table also includes at least one second leg that is coupled to the underside and includes a receiver portion that receives the swing arm in the extended position. The second leg includes a second ganging member that is configured to couple to the first ganging member of the other table for ganging two tables together. The first and second ganging members are releasably coupled to one another by magnetic attraction.

The first ganging member can be in the form of a metal object and the second ganging member can be in the form of a magnet (permanent magnet). The metal object can be disposed within a recess formed in an underside of the swing arm and the magnet can be disposed within a sleeve that is axially movable and represents a locking pin that engages the swing arm, thereby locking the two legs together and ganging the two tables to one another.

BRIEF DESCRIPTION OF DRAWING FIGURES

A more complete understanding of the invention and its many features and advantages will be attained by reference to the following detailed description and the accompanying drawings. It is important to note that the drawings illustrates only a few embodiments of the present invention and therefore should not be considered to limit its scope.

DETAILED DESCRIPTION OF CERTAIN EMBODIMENTS

The present invention is directed to a mechanism for ganging one object, such as a table, to another object, such as another table, to create a larger object, such as a larger table surface. In one embodiment, the ganging mechanism is incorporated into a complementary pair of legs that are attached to the two objects. The ganging of the objects can directly result from a direct coupling between the two complementary legs. Unlike other ganging mechanisms, the mechanism of the present invention can be directly incorporated into the leg structures which are mountable to the two objects. The ganging mechanism of the present invention is designed to create a robust, secure attachment between the two objects and provide a clean, attractive ganged object. In other words, an attractive seam is formed between the two ganged objects.

Figure 1:
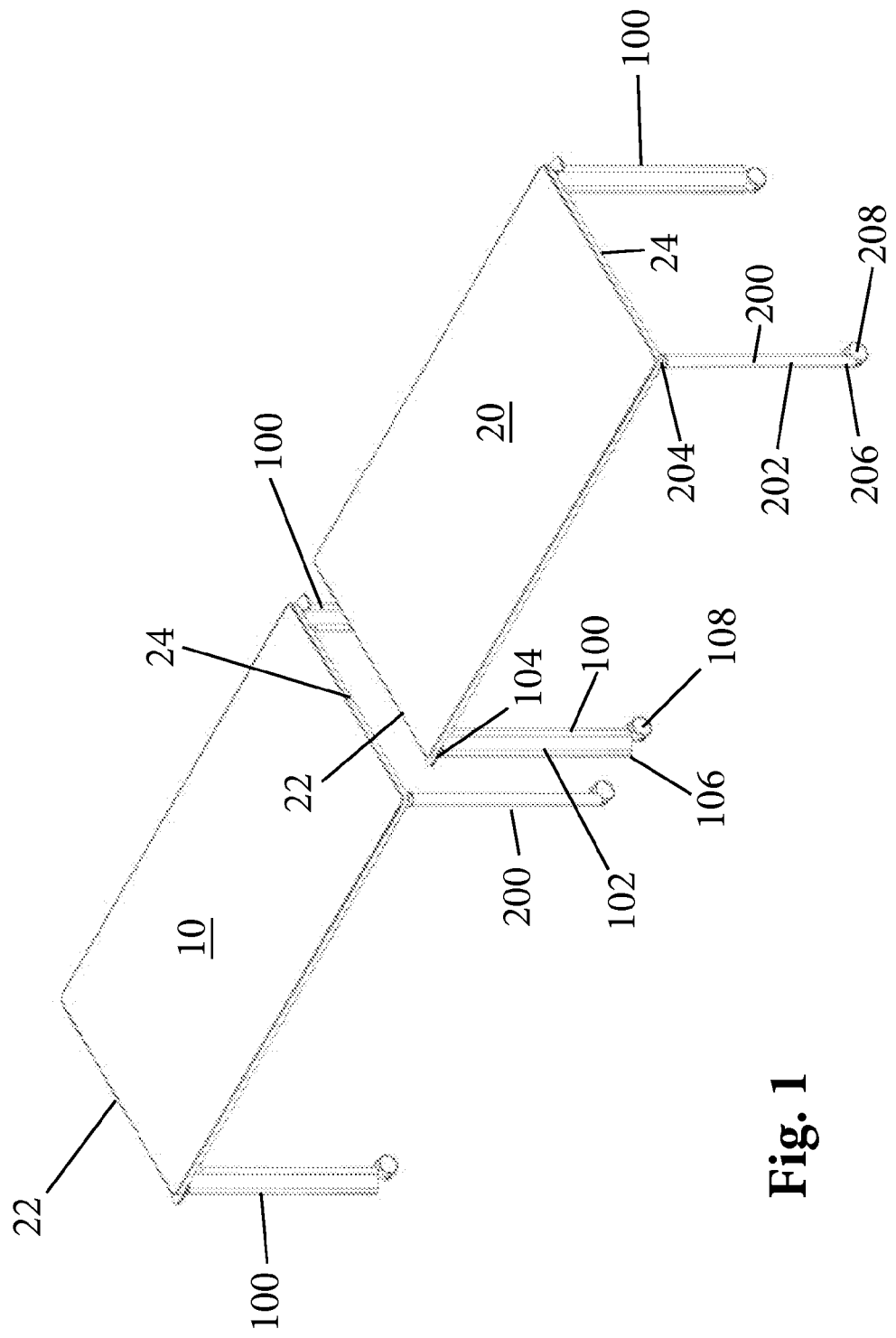
FIG. 1 is a perspective view of a pair of tables prior to being ganged (connected) together.

FIG. 1 shows a first table construction (table) 10 and a separate second table construction (table) 20 prior to ganging the two tables to one another to form a combined, connected larger table. It will be appreciated that the combination of two tables (e.g., tables 10, 20) is merely one exemplary application and more than 2 tables can be combined. In addition, while tables 10, 20 are shown as being the same or substantially the same type of table in FIG. 1, it will be appreciated that the table 10 can have a different construction than the table 20. For example, the size and/or shape of one table can be different than the other table. In FIG. 1, each of the first and second tables 10, 20 has a rectangular shape; however, the tables can have square or round shapes or other shapes. In addition, one larger table can be ganged to one smaller table.

Each of the first and second tables 10, 20 includes a tabletop 30 which is typically an at least substantially planar member and includes a plurality of legs that are coupled to an underside of the tabletop 30. In accordance with the present invention, the plurality of legs comprises two different types of legs and more specifically, each table 10, 20 includes at least one first leg 100 and at least one second leg 200. As described herein, the first and second legs 100, 200 are configured to be releasably coupled to one another resulting in the ganging of the first and second tables 10 to form a single cleanly connected larger table. In one embodiment, each first leg 100 is configured to allow for mating with one second leg 200 and vice versa; however, two of the same types of legs (i.e., either two first legs or two second legs) are not configured to mate with one another. Thus, when the two tables 10, 20 are positioned proximate one another for ganging the two tables 10, 20 together, the legs are arranged such that at least one leg 100 is paired with one second leg 200 to provide at least one attachment (ganging point) between the two tables 10, 20.

In the embodiment shown in FIG. 1, each of the first and second tables 10, 20 includes a first end 22 and an opposite second end 24 and there are four legs in the four corresponding corners of each table 10, 20. More specifically, the second end 24 of the first table 10 is configured to be coupled (ganged) to the first end 22 of the second table 20. As a result, the second end 24 of the first table 10 has one first leg 100 in one corner (first corner) and one second leg 200 in the other corner (second corner) and the first end 22 of the second table 20 has one second leg 200 in one corner (opposite the first leg 100 at the second end 24 of the first table 10) and one first leg 100 in the other corner (opposite the second leg 200 at the second end 24 of the first table 10). Thus, in the embodiment shown in FIG. 1, the first ends 22 of the two tables 10, 20 have the same arrangement of legs and similarly, the second ends 24 of the two tables 10, 20 have the same arrangement of legs.

In the case of a square or rectangular table, the diagonally opposite corners have the same types of legs and thus, even if one table is rotated 180 degrees, the arrangement of the legs is proper to mate with complementary legs of the other table.

As shown in FIG. 1, each leg 100 includes an elongated body 102 that has a first end 104 and an opposite second end 106. The second end 106 can include a foot or a caster 108 to allow for easy movement of the table along a floor or the like. As shown in other figures, the caster 108 can include a brake 109 (FIG. 13) for locking the caster 108 and prevent a further rolling action, thereby locking the table in place. Similarly, each leg 200 includes an elongated body 202 that has a first end 204 and an opposite second end 206. The second end 206 can include a foot or a caster 208 to allow for easy movement of the table along a floor or the like. As shown in other figures, the caster 208 can include a brake 209 (FIG. 13) for locking the caster 208 and prevent a further rolling action, thereby locking the table in place. The first ends 102, 202 of the legs 100, 200 are coupled to the underside of the tabletop by conventional techniques, including the mechanical mount (bracket, etc.) described herein.

Figure 2:
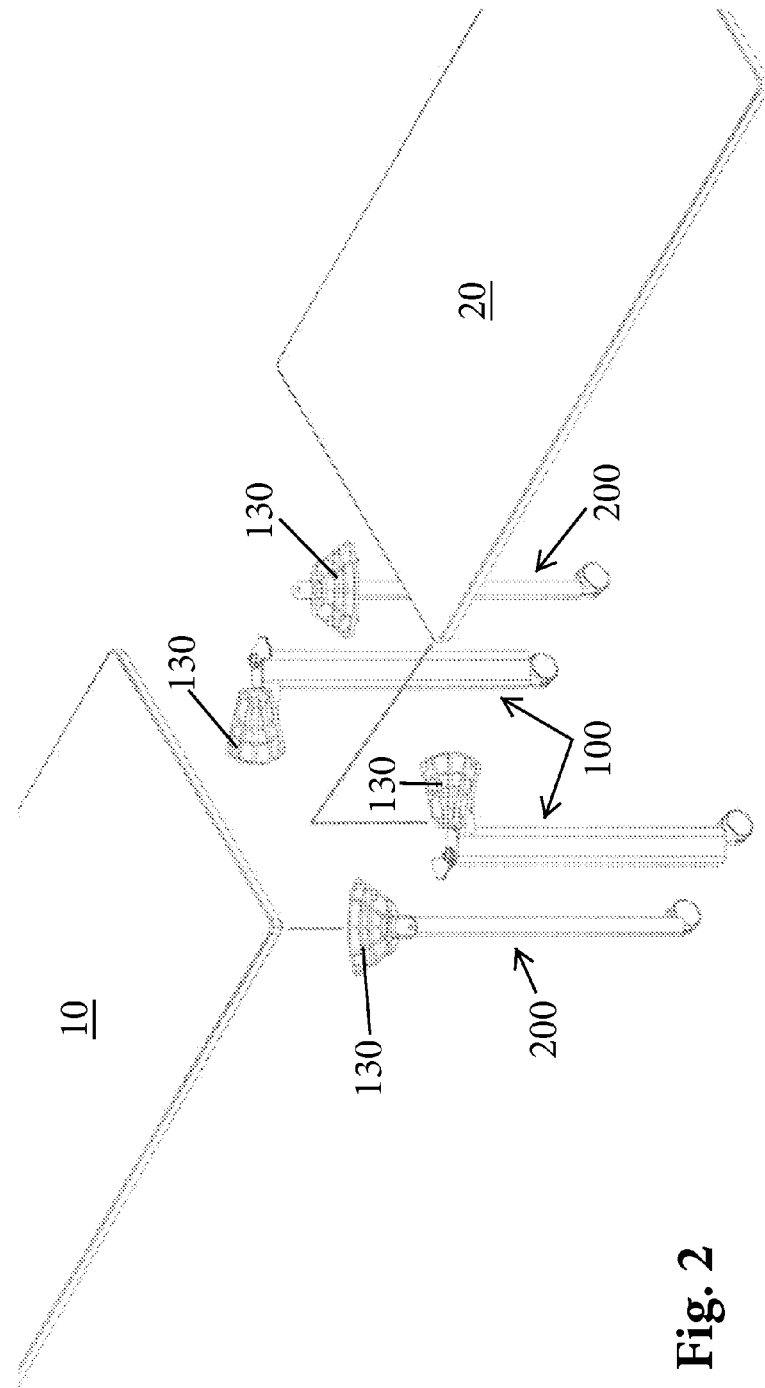
FIG. 2 is an exploded perspective view showing two pairs of legs for attachment to two ends of two adjacent tables.
Figure 6:
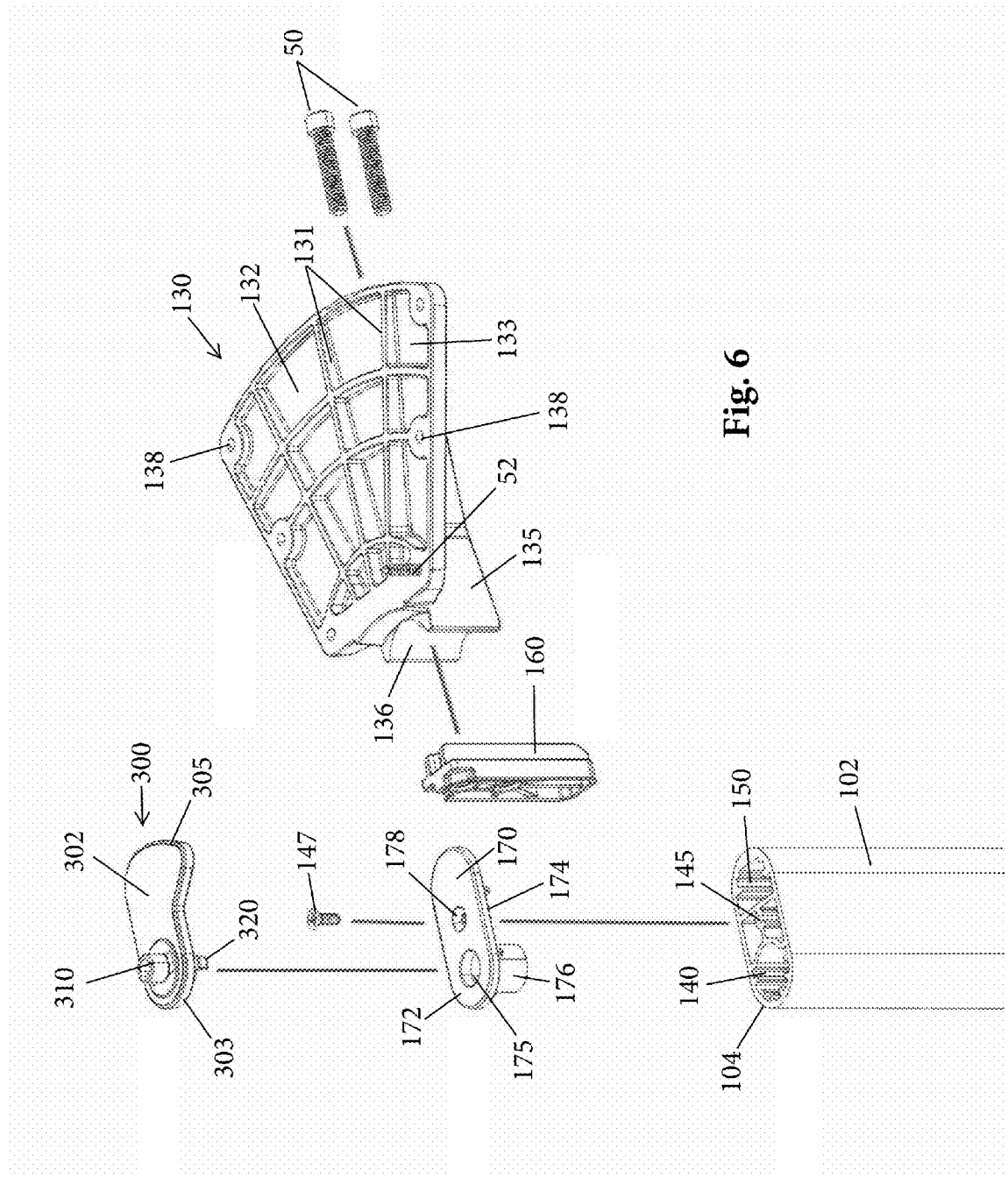
FIG. 6 is an exploded top perspective view of a first leg that includes a first ganging member.
Figure 7:
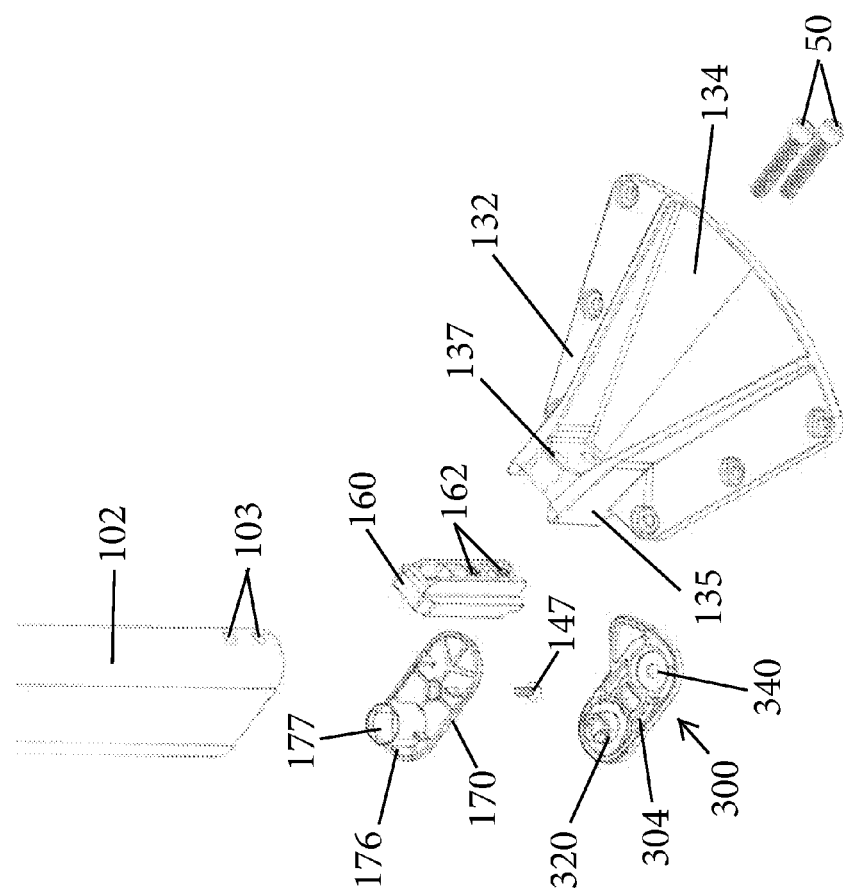
FIG. 7 is an exploded bottom perspective view of the first leg.

FIG. 2 shows the arrangement of the legs 100, 200 at the second end 24 of the first table 10 and legs 200, 100 at the first end 22 of the second table 20. As shown, each leg 100 mates with one corresponding leg 200. The mechanical mount to attach the leg 100, 200 to the underside of the tabletop can be in the form of a casting 130 as shown. As best shown in FIGS. 6 and 7, the casting 130 has a body 132 with a top surface 133 and an opposite bottom surface 134. The body 132 includes a base section 135 that includes a curved inner surface 136 (concave surface). The base section 135 has one or more mounting holes 137 which receive fasteners 50 as described below. Fasteners 50 can be threaded bolts or screws or other types of fasteners (nails, etc.).

The body 132 includes additional mounting holes 138 for mounting the body 132 to the underside of the tabletop using additional fasteners 52. Fasteners 52 can be threaded screws or other types of fasteners including nails, bolts, etc. The top surface 133 is preferably a planar surface to allow the casting to be in flush contact with the underside of the tabletop. The body 132 can be a molded structure and can include reinforcing ribs 131 formed along the top surface 133 and the bottom surface 134. The body 132 can have a curved shape and in the illustrated embodiment, the body 132 has an oblong shape.

In one embodiment, the elongated bodies 102, 202 can have the same construction and be in the form of an extruded member. As shown in the figures, the elongated body 102, 202 is substantially hollow and includes a number of internal support structures that define different individual spaces (compartments) within the hollow interior of the body 102, 202. For example, the hollow interior can include a first space 140 and a second space 150. The first space 140 has a generally circular shape, while the second space 150 has an irregular shape. Between the two spaces 140, 150, there can be a threaded boss 145 for threadingly receiving a fastener 147 as shown in FIG. 6.

A connecting block 160 is used to couple the casting 130 to the respective elongated body 102, 202. The elongated body 102, 202 includes one or more holes 103 (FIG. 7) that open into the second space 150. The connecting block 160 is configured to mate with and in particular, be slidingly inserted and contained within the second space 150. The connecting block 160 include one or more threaded holes 162. To attach the casting 130 to the respective elongated body 102, 202, the connecting block 160 is inserted into the space 150 and the body 132 can include a stop or the like within the second space 150 such that when the connecting block 160 is received within the second space 150, the holes 162, 103 and 137 align with one another and fasteners 50 pass therethrough to securely attach the casting 130 to the body 102, 202. The curved inner surface 136 is complementary to the curved shape of the body 102, 202 such that the inner surface 136 and the curved outer surface of the body 102, 202 seat flush against one another. The casting 130 is thus fixed relative to the leg body 102, 202 and extends radially outward therefrom.

Each of the first and second legs 100, 200 also includes a top cap 170 which mates with the first end 104, 204 of the respective leg 100, 200. A mechanical coupling can be formed between the top cap 170 and the leg 100, 200 and more specifically, a frictional fit (snap-fit) can be used to attach the top cap 170 to the respective leg 100, 200. The top cap 170 has a complementary shape to the first end 104, 204 since the top cap 170 is designed to close off this end but is also designed, as described herein, to provide for one respective ganging member. The illustrated top cap 170 thus has an oblong shape. The top cap 170 has a top surface 172 and an opposing bottom surface 174. The top cap 170 also has a through hole 175 which passes through the top cap 170 and in particular, a hollow boss 176 can extend downwardly from the bottom surface 174 with a bore 177 being formed therein being axially aligned with the through hole 175. Thus, a complete through hole (bore) extends through the complete top cap 170 from the top surface 172 to the bottom surface 174.

When the top cap 170 is mated to the first end 104, 204 of the leg body 102, 202, the boss 176 is received within the first space 140 of the leg body 102, 202.

The top cap 170 also has a mounting hole 178 formed therein for attaching the top cap 170 to the body 102, 202. The mounting hole 178 is axially aligned with the threaded boss 145 to allow the fastener 147 to extend therethrough so as to attach the top cap 170 to the leg body 102, 202. The top cap 170 thus covers and contains the connecting block 160. Once attached to the body leg 102, 202, the only opening (access point) defined in the top cap 170 is through the through hole 175.

The main difference between the first leg 100 and the second leg 200 is the ganging member which is attached thereto. As shown in FIGS. 6-7, the first leg 100 includes a first ganging member 300 which is pivotally attached to the first leg 100 and more specifically, is pivotally attached to the top cap 170. The first ganging member 300 is a generally planar structure with a top surface or face 302 and an opposing bottom surface or face 304. The first ganging member 300 can be in the shape of a paddle and includes a first end 303 and an opposing second end 305. The second end 305 is of a greater size (wider) than the first end 303. The first and second ends 303, 305 can be curved (rounded). The curved end 305 is convex in shape and designed to be received adjacent the curved inner surface 136 of the body 132.

The first ganging member 300 includes an upstanding protrusion 310 which extends outwardly from the top surface 302. The upstanding protrusion 310 can have a circular shape and is configured to be received within a complementary opening that is formed in the underside of the tabletop of the respective table 10, 20. As a result, the formation of these openings (holes) at strategic set locations of the underside of the tabletop serve as locating and indicating features since only the first leg 100 and not the second leg 200 can be mated to such opening. As a result, for each opening (hole) formed in the underside of the tabletop, there is a complementary first leg 100 for mating therewith. The protrusion 310 serves also as a pivot axle in that the first ganging member 300 pivots about an axis that extends centrally through the protrusion 310. The protrusion 310 is thus configured to rotate within the opening in the underside of the tabletop; however, a frictional fit can be formed so that the first ganging member 300 does not quickly spin within the opening without any resistance. By having some resistance, the user can more easily control and position the first ganging member 300.

Along the bottom surface 304 of the first ganging member 300, a retaining member 320 is formed and is configured to allow the first ganging member 300 to be coupled to the top cap 170 such that the first ganging member 300 can rotate relative to the top cap 170. The retaining member 320 can be a mechanical coupler that rotatably couples the first ganging member 300 to the top cap 170. The retaining member 320 can be in the form of a clip or prongs that mate with complementary features formed internally within the hollow boss 176 resulting in the coupling between the two.

It will be appreciated that an axis of rotation of the first ganging member 300 is defined through the protrusion 310 and the retaining member 320.

An O-ring 333 (FIG. 9) can be disposed between the underside of the first ganging member 300 and the top surface of the top cap 170 and more particularly, the O-ring 333 is disposed about the retaining member 320 the extends outwardly from the bottom surface. The O-ring 333 can create additional friction to prevent rapid, uncontrolled rotation of the first ganging member 300.

Figure 3:
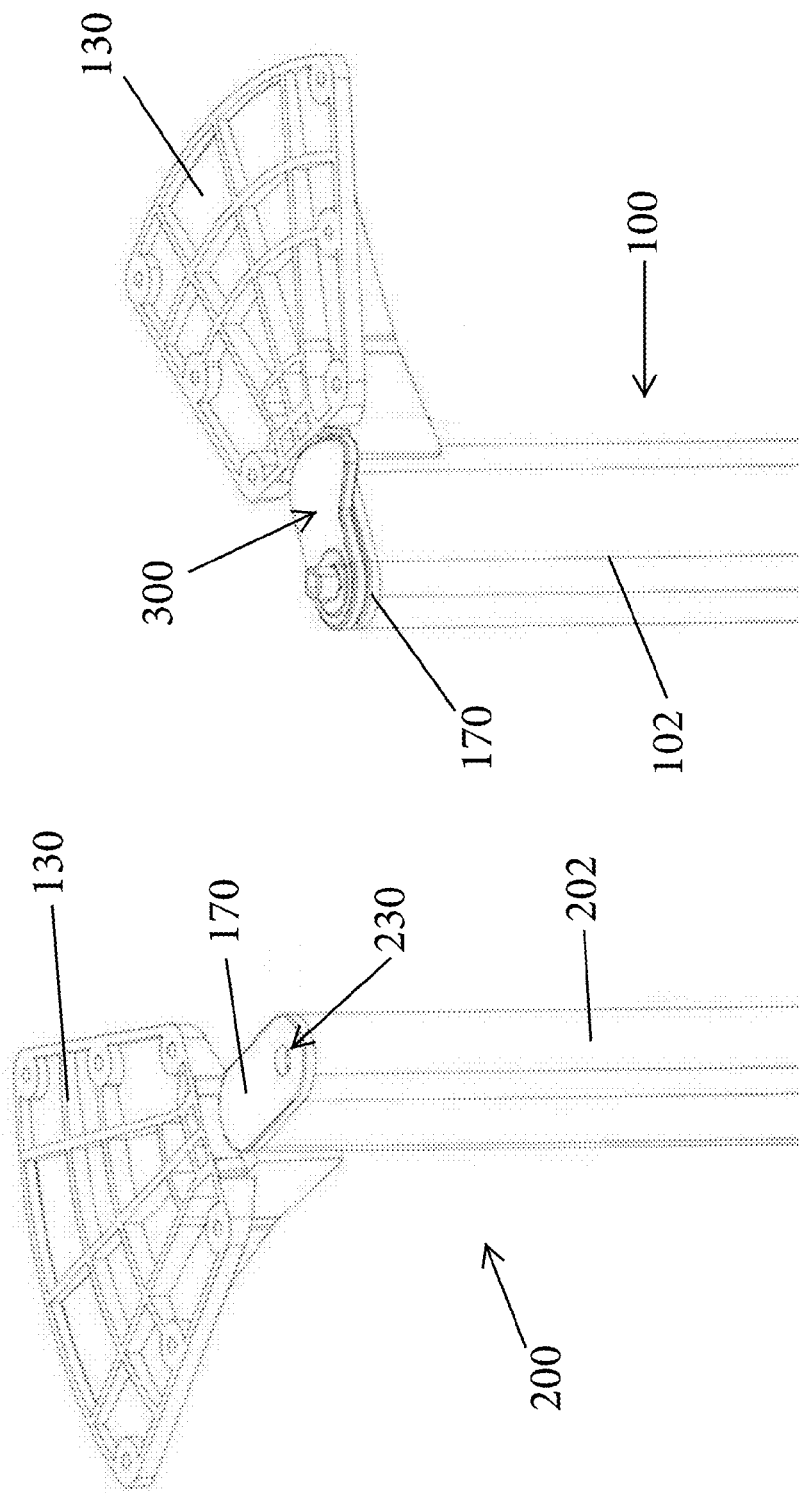
FIG. 3 is a perspective view of one pair of legs that are configured to be coupled to one another for ganging of the tables, wherein a ganging feature of one of the legs being shown in a first position (stowed position)
Figure 4:
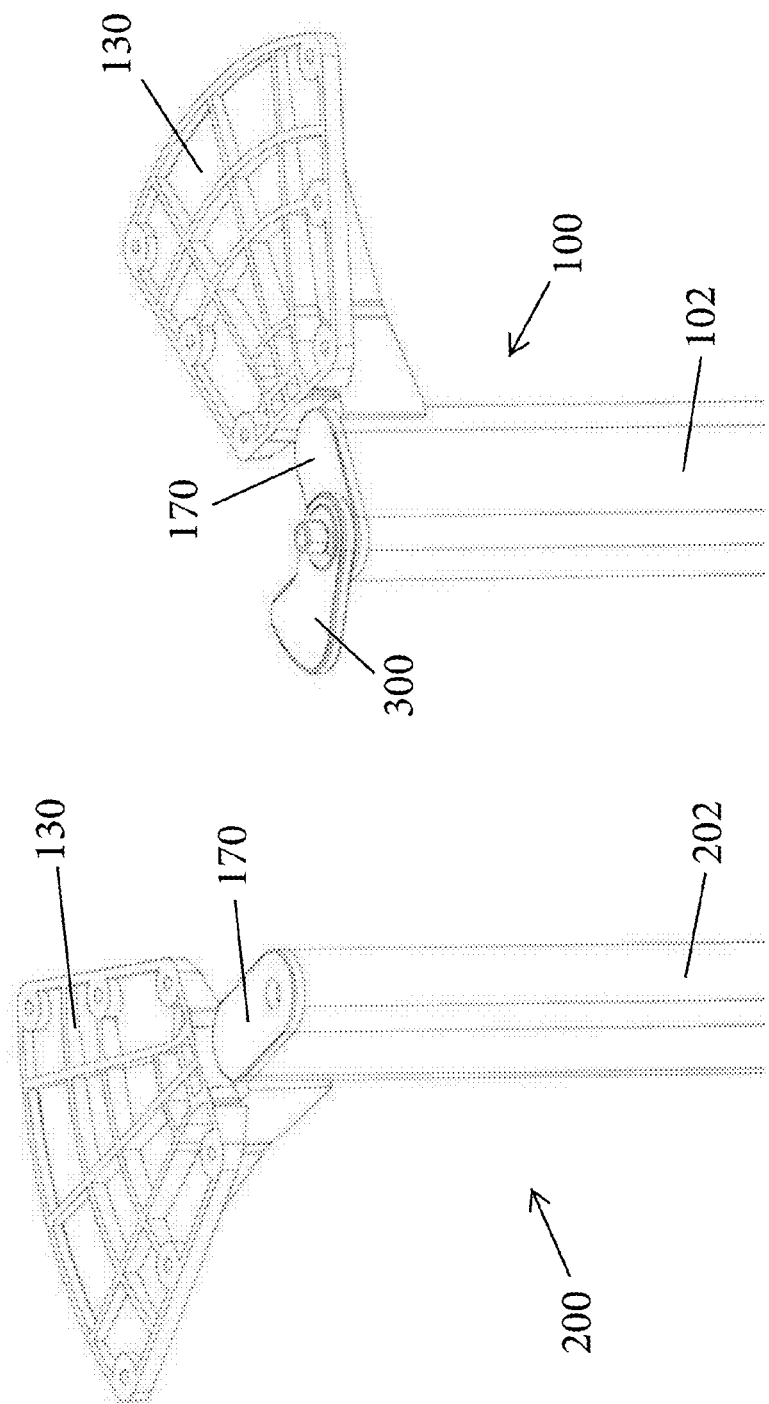
FIG. 4 is a perspective view of the pair of legs with the ganging feature of the one leg being shown in a second position (extended/in-use position)
Figure 5:
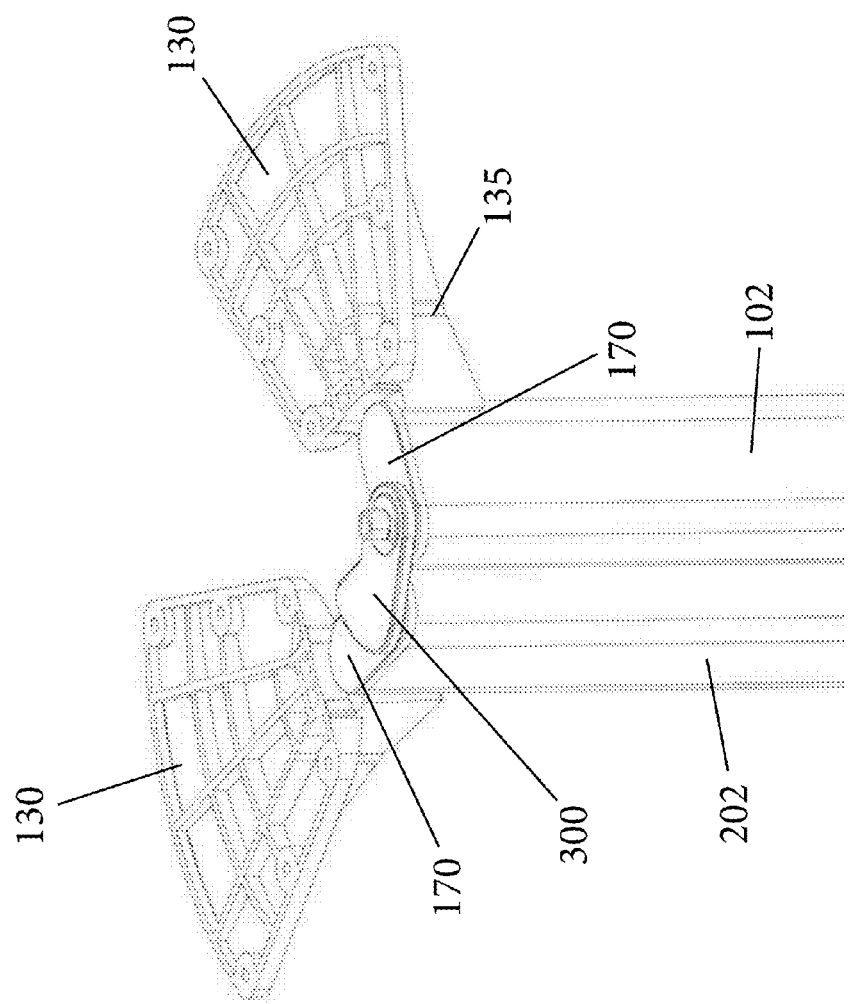
FIG. 5 is a perspective view of the pair of legs coupled to one another.

The first ganging member 300 can be thought of as a pivoting arm that moves between a first position which is a stowed position (FIG. 3) and a second position which is an extended, in-use position (FIG. 4). The casting 130 is arranged to mate with leg body 102 at such a location and the body 132 has a height such that a space is formed above the top cap 170 which is sized to receive the first ganging member 300 and permit it to pivot between the first and second positions. In other words, in the stowed position, the first ganging member 300 is disposed between the top cap 170 and the underside of the tabletop within such space. The top surface of the top cap 170 is thus below the top surface of the body 132 to create and define such space.

Figure 9:
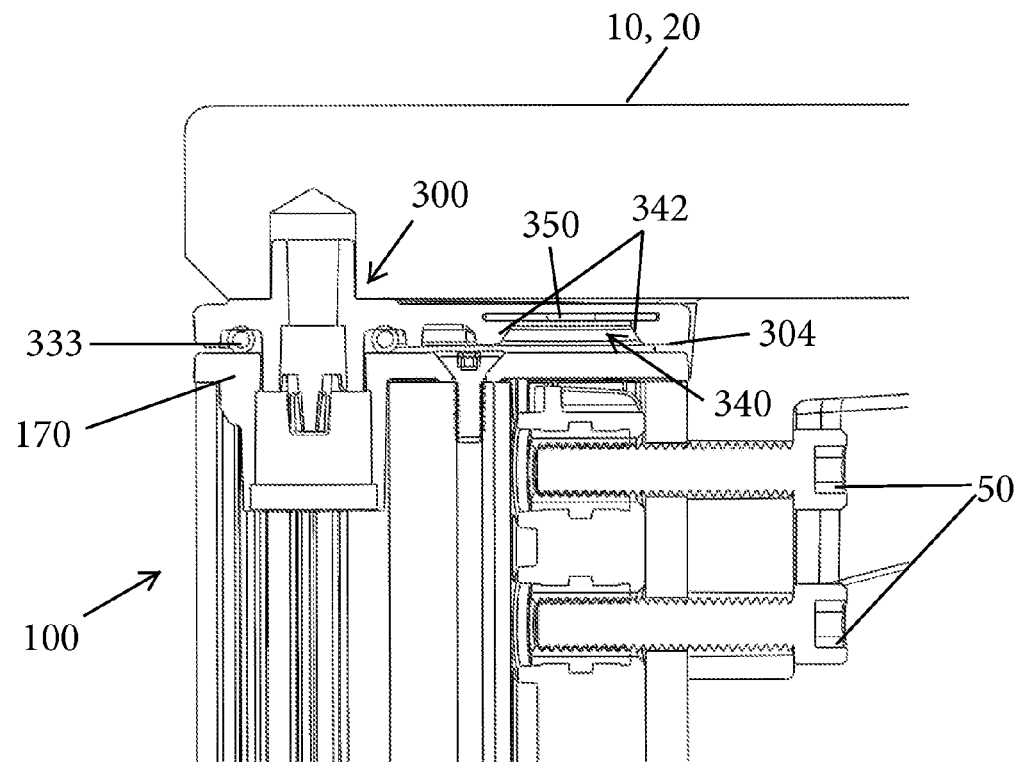
FIG. 9 is a cross-sectional view of the first leg attached to a table (support surface) with the first ganging member being shown in the first position (stowed position)
Figure 10:
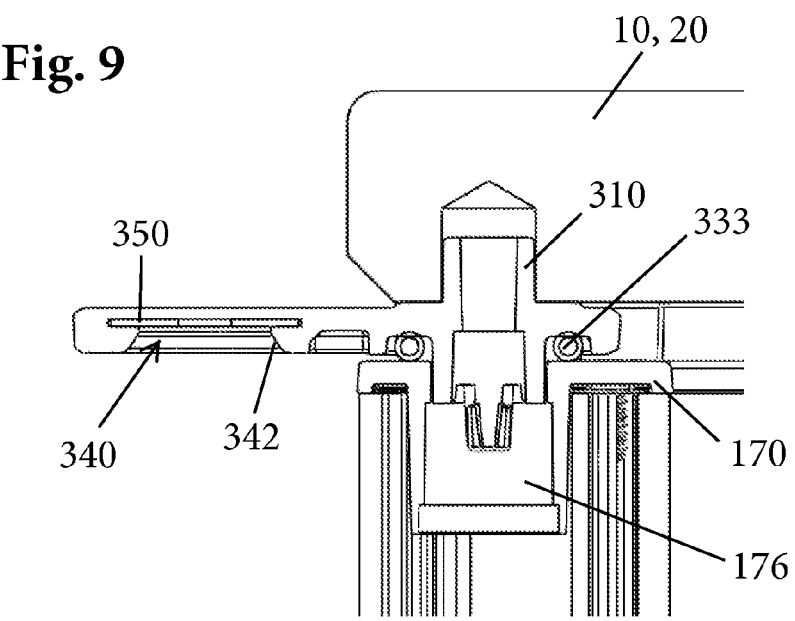
FIG. 10 is a cross-sectional view of the first leg attached to the table with the first ganging member being shown in the second position (extended/in-use position)

As shown in FIGS. 7, 9 and 10, the bottom surface 304 of the body of the first ganging member 300 includes a recessed portion (a recess) 340 that is disposed proximate the curved second end 305. A peripheral edge of the recessed portion 340 is a chamfered edge 342. Within the recessed portion 340 a first coupling member 350 is disposed. The first coupling member 350 is, in the illustrated embodiment, a first magnetic member, such as a piece of metal (e.g., a metal washer) that is securely retained within the recessed portion 340. The first coupling member 350 (first magnetic member) is designed to mate with a complementary second magnetic member as described below. The first coupling member 350 is retained within the recessed portion 340 using any number of conventional techniques. The first coupling member 350 can have a planar construction as shown.

Figure 8:
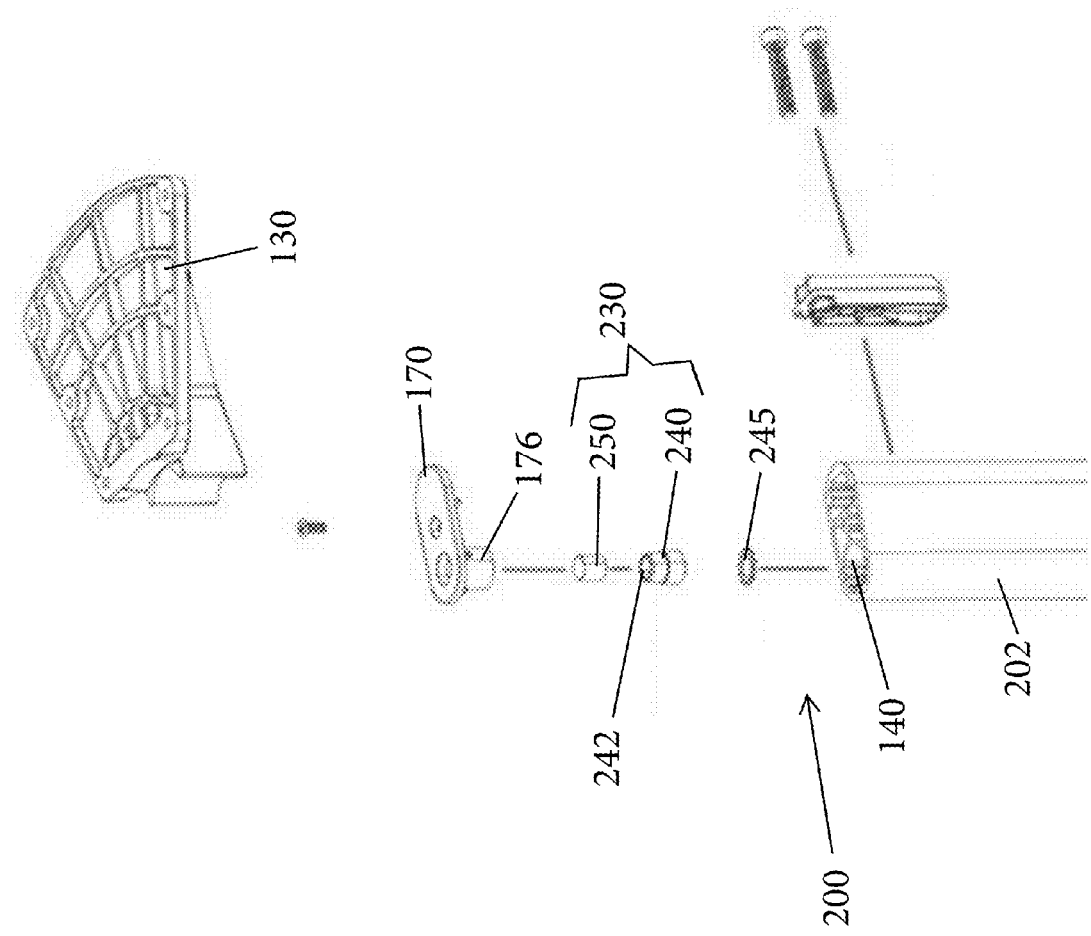
FIG. 8 is an exploded top perspective view of a second leg that includes a second ganging member.

FIG. 8 shows one exemplary second leg 200. As previously mentioned, the first and second legs 100, 200 share a number of the same parts which are numbered alike in the drawings. The main difference between the two is the ganging feature that is incorporated within each one. The second leg 200 includes a second ganging member 230 which is complementary to the first ganging member 300 and is configured such that the first and second ganging members 230, 300 are coupled to one another, engage one another, interlock with one another or otherwise mate or are attracted to one another to cause a ganging between the first and second legs 100, 200 and thus between the two tables 10, 20.

The second ganging member 230 comprises a number of parts that form an assembly. As shown in FIG. 8, the second ganging member 230 can include a housing or casing in the form of a sleeve 240 which contains a second coupling member 250 which is complementary to the first coupling member 350. The sleeve 240 is a hollow structure that has an open first end 242. The sleeve 240 is shaped and sized to be received within the first space 140 that is formed in the body 202 of the second leg 200. A washer 245 can be used and inserted into the first space 140. The second coupling member 250 can be in the form of a second magnetic member that is designed to mate with the first magnetic member. More specifically, the second magnetic member can be in the form of a magnet that is contained within the sleeve 240.

The top cap 170 is then mated to the first end of the body of the second leg 200. The sleeve 240/magnet 250 combination is received within the hollow boss 176 that is itself received in the first space 140. It will be appreciated that the combined sleeve/magnet can move axially within the hollow boss 176 and can move between a first position (retracted position) (FIG. 15) in which the sleeve/magnet are disposed at least substantially within the boss 176 and do not protrude above the top surface of the top cap 170 and a second position (extended position) (FIG. 16) in which the sleeve/magnet extend above the top surface of the top cap 170.

FIG. 9 shows the first leg 100 with the first ganging member 300 in the first stowed position within the open space defined between the underside of the tabletop and the top cap 170. FIG. 10 shows the first ganging member 300 in the extended position. It will be appreciated that the curved end of the first ganging member 300 lies beyond the end of the table and therefore, the first coupling member 350 is accessible and spaced from the end of the table. To move between these two positions, the first ganging member 300 is pivoted about the pivot axis discussed herein. The underside of the first ganging member 300 can have a structure (finger locator) to assist in the user manually grasping the first ganging member 300 in the stowed position and then pivoting to the second position.

Figure 11:
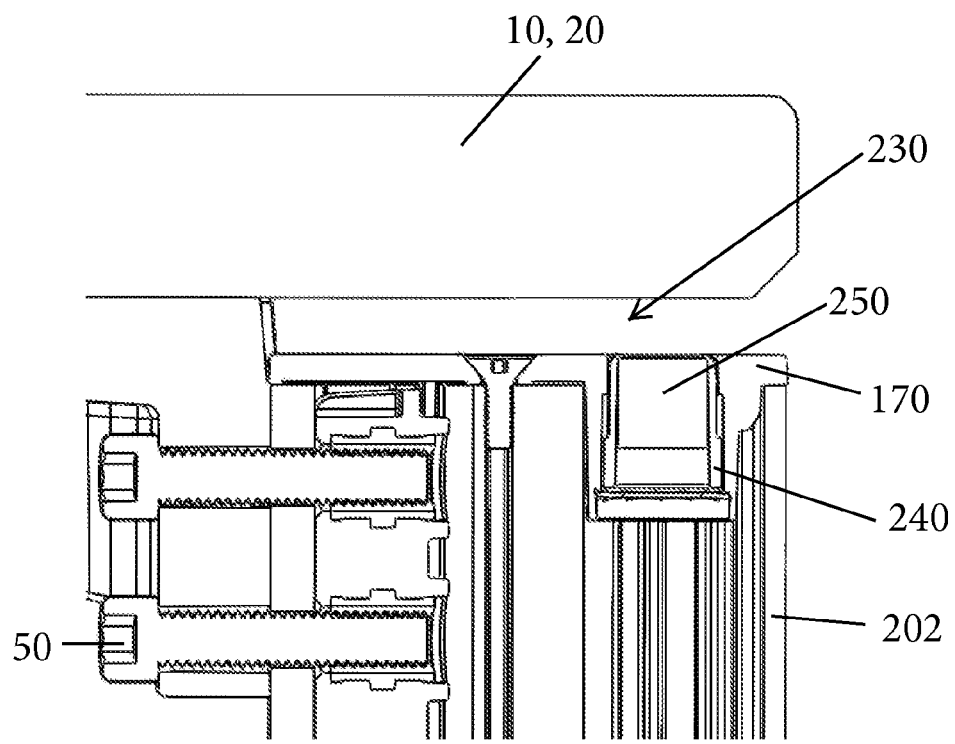
FIG. 11 is a cross-sectional view of the second leg attached to a table (support surface) with the second ganging member being shown in a first position (ready position)
Figure 12:
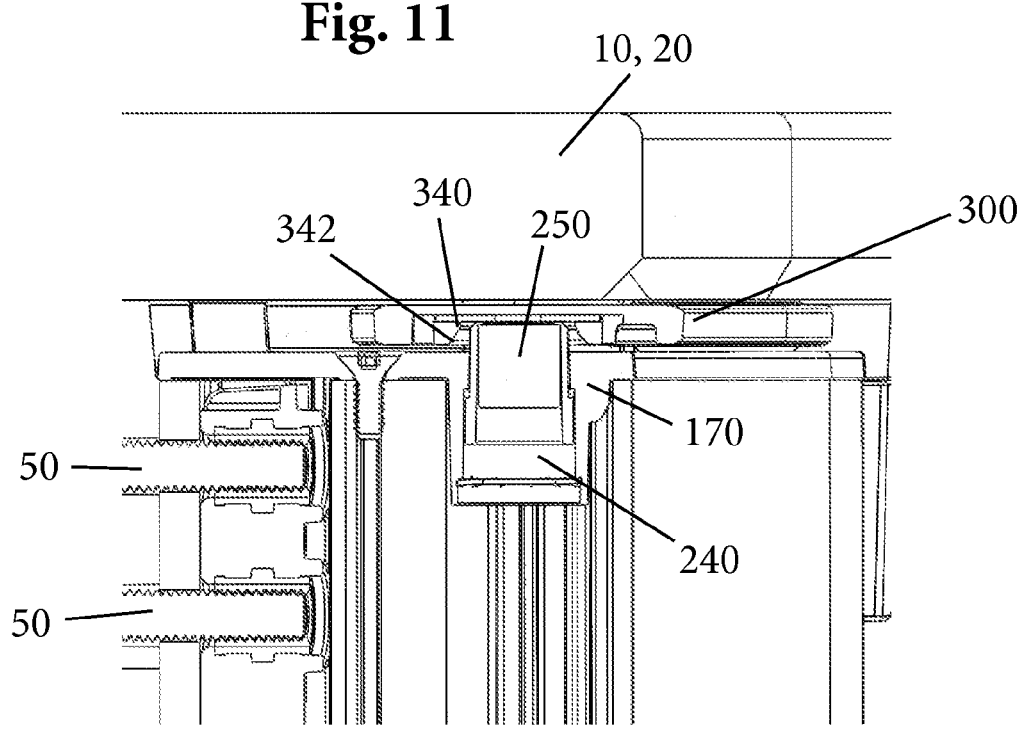
FIG. 12 is a cross-sectional view of the second leg attached to the table with the second ganging member being shown in a second position (active position)

FIG. 11 shows the second leg 200 with the second coupling member 250 of the second ganging member 230 in the first position in which the sleeve/magnet are retracted within the boss and a receiver space 199 is formed between the underside of the table and the top surface of the top cap 170. The combined sleeve/magnet can be thought of as being a pin structure that is magnetically attracted to the first coupling member 350 (metal washer or the like) formed in the first ganging member 300. As soon as the magnet and metal washer are brought into close proximity, the movable sleeve/magnet assembly is drawn by magnetic force upward into intimate contact with the metal washer 350 as shown in FIG. 12 (the top of the magnet lies within the recessed portion 340). This results in the magnetic coupling between the first and second ganging members 230, 300.

The selection of the magnet and complementary metal structure are done in view of the intended application and exert a sufficient magnetic force that results in the two legs 100, 200 being coupled to one another. The two legs and two ganged tables are not easily and freely separable from one another but instead an applied force is required to overcome the magnetic force and cause the separation of the coupled legs 100, 200. To separate the two ganged tables, the two tables are pulled laterally apart from one another. As the two tables 10, 20 are pulled laterally, the top of the sleeve/magnet assembly contacts the chamfered edge 342 which acts as a cam and allows the first ganging member 300 to separate from the second ganging member 230. As soon as such separation occurs, the combined sleeve/magnet is free to drop downward within the boss 176 in the top cap 170 and assume the retracted position (FIG. 11).

In the above manner, the combined sleeve/magnet (second coupling member) can be thought of as a pin that is at least partially received within the recessed portion 340 for locking the two ganging members 230, 300 to one another. This results in the two legs 100, 200 being locked together and accordingly, the two tables 10, 20 being ganged together to create a larger table. One of the advantages of the present invention is that a clean seam is produced between the two ganged tables 10, 20 and thus, the ganging mechanism of the present invention not only provides a robust method for ganging tables together but also is an attractive system.

It will be appreciated that the space 199 above the top cap 170 of the second leg 200 is sized to receive the first ganging member 300. The height of the first ganging member 300 can thus be equal to or slightly less than the height of this space 199.

Figure 13:
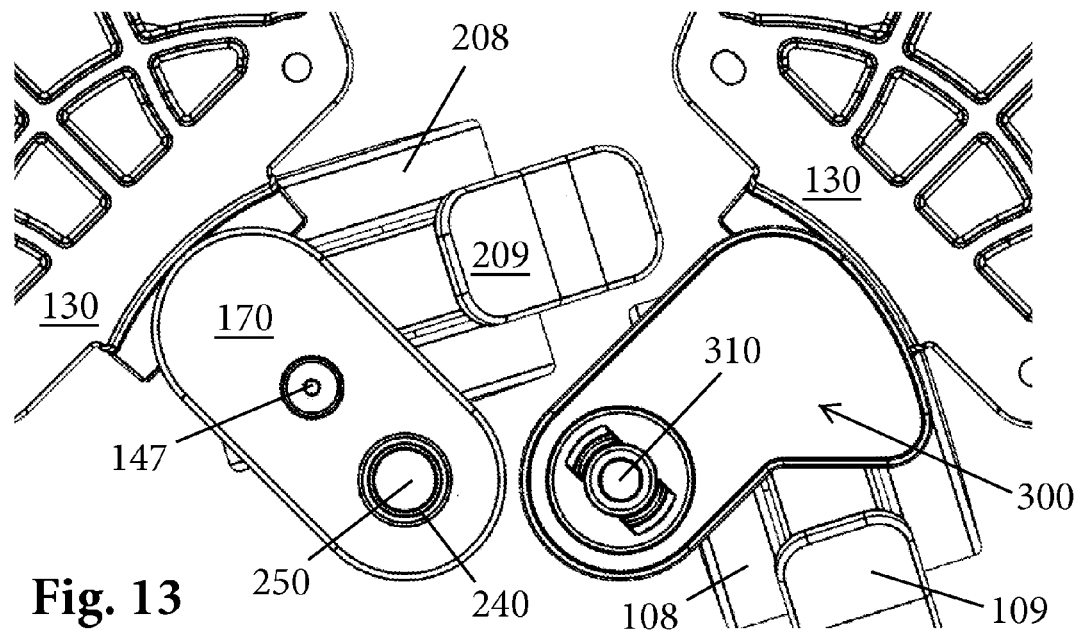
FIG. 13 is a top view of the first and second legs in an unganged (uncoupled) position.
Figure 14:
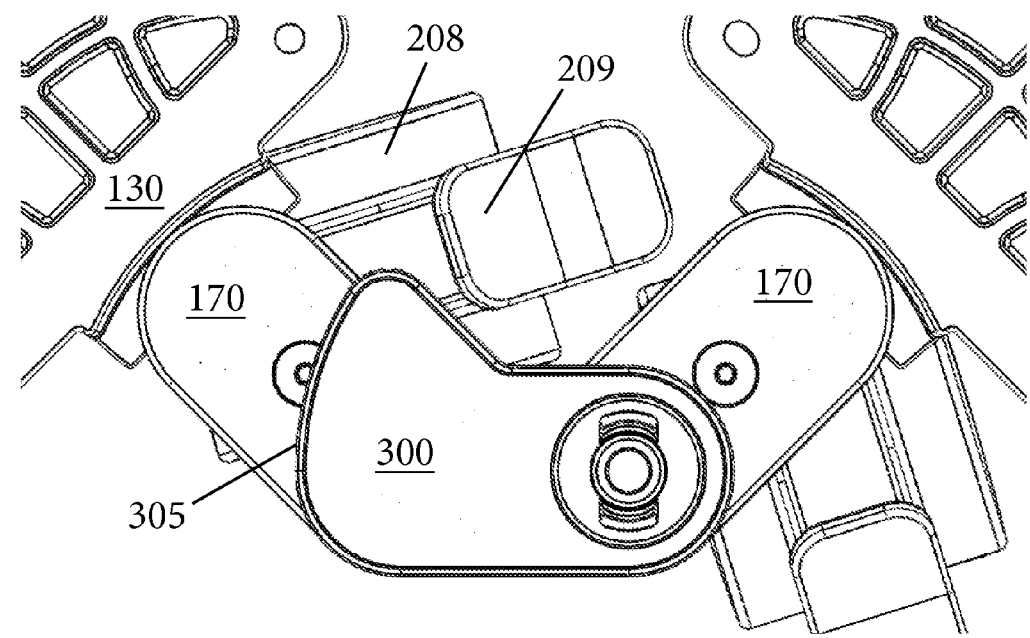
FIG. 14 is a top view of the first and second legs in a ganged position.

FIG. 13 is a top view showing the tabletops removed from the two tables to show the positions of the first and second ganging members 300, 230 in the unganged position. FIG. 14 is a top view showing the first and second ganging members 300, 230 in the ganged position.

Figure 15:
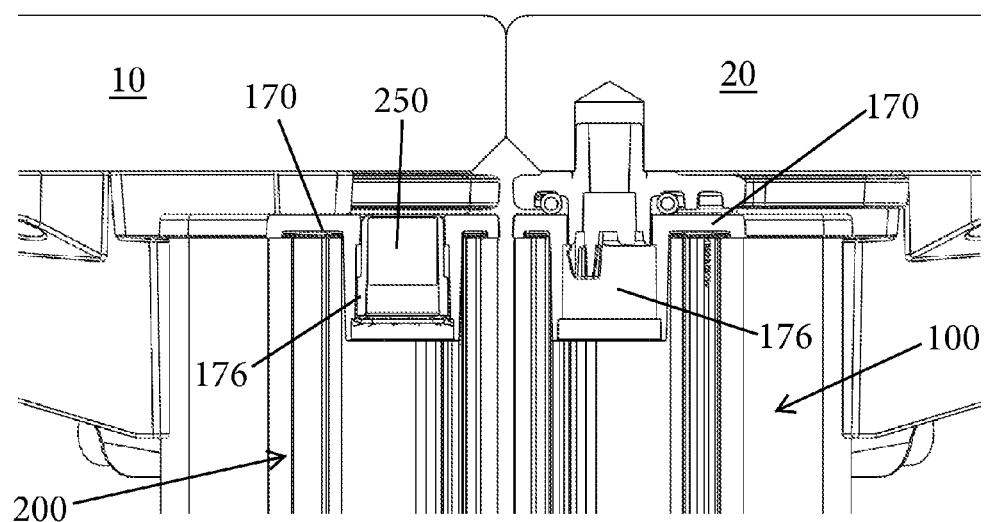
FIG. 15 is a cross-sectional view through the ganging mechanism (first and second ganging members) which is in an unganged position.
Figure 16:
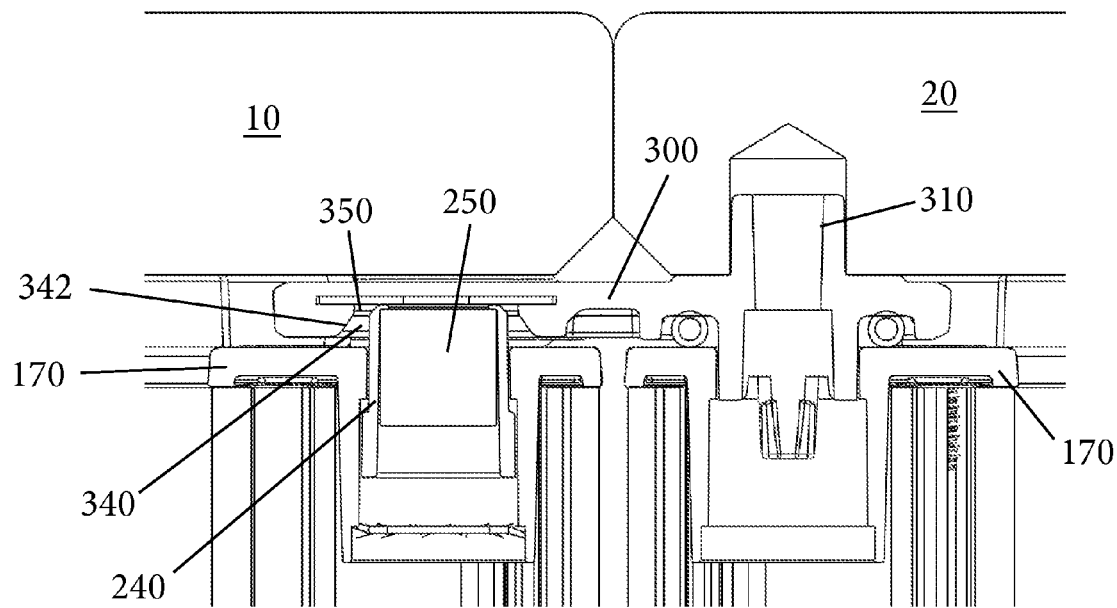
FIG. 16 is a cross-sectional view through the ganging mechanism which is in the ganged position.

FIG. 15 is side cross-sectional view showing the two tables 10, 20 in abutting relationship just prior to pivoting the first ganging member 300 into the receiver space 199 defined in the second leg 200. Thus, FIG. 15 also shows the unganged position. FIG. 16 shows the ganged position in which the two tables 10, 20 are ganged together and the first and second coupling members 350, 250 are coupled (e.g., via magnetic force).

It will also be appreciated that the first and second coupling members 350, 250 can be switched in that the magnet 250 can be carried by the first ganging member 300 (within the recessed area 340) and the metal object (ferromagnetic material) can be disposed within the sleeve 240. The magnetic attraction remains the same as in the illustrated embodiment in that the sleeve 240 and metal object act as a pin that protrudes above the respective cap 170 into the recessed area 240 to thereby couple the two legs together and thereby gang one table to another.

In yet another embodiment, instead of using magnet 250 within the sleeve 240, a biased plunger construction can be used in that the second leg 200 includes within the boss of the top cap 170 a biased plunger that seats therein similar to the sleeve 240. The biased plunger construction can be a spring loaded ball plunger that seats within the top cap 170 of the second leg 200 (the plunger can be normally biased in the extended position and when the swing arm makes initial contact causes a slight retraction of the plunger until the plunger aligns with the opening (recess 240) at which time it the biasing forces thereof cause it to travel into the opening. The plunger construction acts as a movable pin like the magnet/sleeve described herein. The plunger is configured to be received within an opening (like the recessed portion 240)

formed in the underside of the swing arm of the first leg 100. When the swing arm is moved to the extended position and the opening in the underside of the swing arm is axially aligned with the plunger, the spring of the plunger causes the plunger to enter the opening, thereby coupling and locking the swing arm to this receiver portion of the second leg. This results in the tables to which the legs are mounted being ganged together.

The leg of the present by design allows a user to attach two tops together with the same bracket underneath the table in essence you can have two tops with only six legs where normally a user would always need eight legs and thus, the present invention allows a user to save money. The teachings of the present invention thus provide the ability to permanently or at least until you took out the screws have a very long table up 144 inches using just six legs.

In addition, it will be appreciated ganging members based on magnetic attraction can be provided as an accessory instead of being integrally formed as part of the two legs 100, 200. In other words, the swing arm described herein can be mounted to the underside of a first table and the receiver portion (which includes a movable magnet pin structure) is mounted to the underside of the other table. The swing arm is thus pivotally attached to the underside of the table. The magnet pin structure can be part of a bracket that is mounted to the underside of the table and has a receiver space that receives the swing arm and allows the pin structure to be received within the recessed portion of the swing arm. The bracket can thus be similar to the top cap with the exception that the bracket has a portion that directly attaches to the underside of the table. In this embodiment, the swing arm and magnet based pin are utilized as in the prior embodiment described herein with the exception that they are separate from the legs which can be mounted to the table at different locations.

The bracket of the receiver portion can be an L-shaped bracket or U-shaped bracket in which a top leg thereof is mounted to the underside of the table and a parallel bottom leg is similar to the top cap in that it has a boss extending downwardly therefrom in which the sleeve/magnet 240, 250 are disposed identical to the previous embodiment (the receiver space is defined between the bottom leg and the underside of the table). The swing arm can be likewise mounted with a bracket (e.g., U-shaped) in which the top leg is mounted to the underside of the table and the bottom parallel leg has structure similar to the top cap in that it includes the boss 176 into which the retaining member is received and coupled to allow the pivoting of the swing arm. The swing arm is pivoted to the extended position and is received between the bottom leg of the bracket and the underside of the table. When the metal plate 350 in the swing arm is in close proximity, the pin (magnet/sleeve) is drawn upward as described herein to lock the two ganging members together. These ganging members are thus not associated with the legs.

It will be appreciated that the legs (i.e., the first and second legs) described herein and illustrated in the accompanying drawings can be used with other structures besides tables. For example, the legs can be used with other support surface members which are to be detachable coupled (ganged) to one another. For example, the legs of the present invention can be incorporated into benches, stools, seats, and other support structures which are desired to be releasably interlocked in a clean manner.

In yet another embodiment, the first and second ganging members can be coupled directly to the table instead of the legs with one ganging member being coupled to the underside of one table and the other ganging member being coupled to the underside of the other table with the one ganging member be movable between a retracted position and an extended position. In this embodiment, the two ganging members are coupled to one another by magnetic force (magnetic attraction). Thus, one ganging member can be a swing arm carrying a metal plate or a magnet and the other ganging member can be the other of metal plate and magnet.

As mentioned herein, the legs 100, 200 can be part of a modular table system in that the legs 100, 200 that include the integral ganging mechanism can be attached to any number of different types/styles of tables. The tables include strategically placed locating marks (i.e., holes) that guide the assembler into correctly placing the first legs that include the pivotable swing arm and can include second locating marks that guide the placement of the second legs 200. The present invention thus offers a simple, modular table system having the advantages described herein. Any number of different materials can be used to form the structures of the legs including metals, plastics, etc. As mentioned herein, the elongated portions of the legs can be extruded parts and many of the other parts can be molded parts.

Although the present invention has been described above using specific embodiments and examples, there are many variations and modifications that will be apparent to those having ordinary skill in the art. As such, the described embodiments are to be considered in all respects as illustrative, and not restrictive. Therefore, the scope of the invention is indicated by the appended claims, rather than by the foregoing description. All changes that come within the meaning and range of equivalency of the claims are to be embraced within their scope.

What is claimed is:

1. A ganging mechanism for releasably attaching a first table to a second table, the ganging mechanism comprising:
   a first leg including a first casting and a first elongated body having a first top cap disposed on an upper end thereof, the first casting extending outwardly from the first elongated body and adapted to fixedly mount to an underside of the first table, and a first ganging member pivotally attached directly to the first top cap, the first ganging member pivotable about a vertical axis and positionable between a stowed position and an extended position; and
   a second leg including a second casting and a second elongated body having a second top cap disposed on an upper end thereof, the second casting extending outwardly from the second elongated body and adapted to fixedly mount to an underside of the second table, the second leg including a second ganging member mounted within the second top cap and configured to couple to the first ganging member when the first ganging member is in the extended position, resulting in the first table being ganged to the second table;
   wherein the first and second ganging members are releasably coupled to one another by magnetic attraction.

2. The ganging mechanism of claim 1, wherein a receiver space is defined between the underside of the second table and an upper surface of the second top cap.

3. The ganging mechanism of claim 2, wherein the first ganging member is received in the receiver space when pivoted to the extended position.

4. The ganging mechanism of claim 1, wherein the first ganging member includes a first coupling member and the second ganging member includes a second coupling member.

5. The ganging mechanism of claim 4, wherein the first coupling member is a magnetic member and the second coupling member is a magnet.

6. The ganging mechanism of claim 1, wherein the first ganging member comprises a pivotable arm disposed within a space above the first top cap of the first leg and is pivotally attached to the first top cap, the pivotable arm having a bottom surface that includes one of a metal substrate and a magnet; and wherein the second ganging member comprises a pin structure formed of the other of a magnet and a metal substrate and which is axially movable within an opening formed in the second top cap, whereby when the pivotable arm is pivoted to the extended position, the pin is drawn into engagement with the pivotable arm, thereby coupling the first and second legs to one another, resulting in the first table being ganged to the second table.

7. The ganging mechanism of claim 1, wherein the first and second elongated bodies of the first and second legs are hollow and closed off at the upper ends thereof by respective first and second top caps.

8. The ganging mechanism of claim 7, wherein the first and second castings are each coupled to respective first and second legs by a connecting block received within the hollow space of the first and second legs.

9. The ganging mechanism of claim 8, wherein an underside of each of the first and second tables includes at least one purposely placed hole which marks a location at which the first and second legs are to be mounted.

10. The ganging mechanism of claim 9, wherein the pivotable arm includes an upstanding protrusion that extends from a top surface thereof, the protrusion being received within the hole in the underside of the respective table.

11. The ganging mechanism of claim 10, wherein a pivot axis of the pivotable arm passes through the protrusion.

12. The ganging mechanism of claim 1, wherein the first and second tables are arranged such that the first leg is in facing relationship to the second leg to allow the first ganging member to move to the extended position and be coupled to the second ganging member.

13. A first table configured to be ganged to a second table, the first table comprising:

a table top having an underside with at least one hole formed therein;

at least one first leg coupled to the underside and including a portion which is received within the hole, the first leg including a pivotable swing arm defining a first ganging member, the swing arm pivotable about a vertical axis and positionable between a stowed position and an extended position in which a portion of the swing arm extends beyond a peripheral edge of the table; and at least one second leg coupled to the underside and including a receiver portion adapted to receive one swing arm associated with the second table when the one swing arm is in the extended position, the second leg including a second ganging member configured to couple to the first ganging member of the second table for ganging the first and second tables together;

wherein the first and second ganging members are releasably coupled to one another by magnetic attraction.

14. The first table of claim 13, wherein the first ganging member comprises a metal object and the second ganging member comprises a magnet.

15. The first table of claim 14, wherein the metal object is disposed within a recess formed in an underside of the swing arm and the magnet is disposed within a sleeve that is axially movable and represents a locking pin that engages the swing arm, thereby locking the first and second legs together and ganging the first and second tables to one another.

16. A ganging mechanism for releasably attaching a first table to a second table to form a larger combined table, the ganging mechanism comprising:

a first leg coupled to an underside of the first table, the first leg including a horizontally pivotable swing arm that carries a first ganging member, the swing arm being positionable between a stowed position and an extended position; and a second leg coupled to an underside of the second table, the second leg includes a receiver portion that receives the swing arm in the extended position, the second leg including a second ganging member configured to couple to the first ganging member resulting in the first table being ganged to the second table;

wherein the first and second ganging members are releasably coupled to one another by magnetic attraction.

17. The ganging mechanism of claim 16, wherein the first ganging mechanism is integrally formed in the first leg and the second ganging mechanism is integrally formed in the second leg such that the first and second ganging mechanisms are separable from the first and second tables while remaining intact with the first and second legs, respectively.

18. The ganging mechanism of claim 16, wherein the first leg includes a first top cap disposed on an upper end thereof, the pivotable swing arm is pivotally attached to the first top cap and disposed within a space above the first top cap the pivotable swing arm having a bottom surface that includes an opening, and wherein the second ganging member comprises a pin structure which is axially movable, whereby when the pivotable swing arm is pivoted to the extended position the pin structure is drawn into the opening of the pivotable swing arm, thereby coupling the first and second legs to one another and resulting in the first table being ganged to the second table.

19. The ganging mechanism of claim 18, wherein the opening of the pivotable swing arm includes a metal object and the pin structure includes a magnet, whereby the magnet and metal object are coupled by magnetic attraction to thereby couple the first and second legs to one another.

\* \* \* \* \*